United States Patent
Zhang

(10) Patent No.: US 11,080,481 B2
(45) Date of Patent: Aug. 3, 2021

(54) METHOD AND DEVICE FOR CLASSIFYING QUESTIONS BASED ON ARTIFICIAL INTELLIGENCE

(71) Applicant: BEIJING BAIDU NETCOM SCIENCE AND TECHNOLOGY CO., LTD., Beijing (CN)

(72) Inventor: Jun Zhang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 1030 days.

(21) Appl. No.: 15/627,220

(22) Filed: Jun. 19, 2017

(65) Prior Publication Data
US 2018/0121801 A1    May 3, 2018

(30) Foreign Application Priority Data
Oct. 28, 2016  (CN) .......................... 201610972616.4

(51) Int. Cl.
*G06F 40/20*  (2020.01)
*G06N 3/04*   (2006.01)
(Continued)

(52) U.S. Cl.
CPC ............ *G06F 40/20* (2020.01); *G06F 40/237* (2020.01); *G06F 40/30* (2020.01); *G06N 3/0445* (2013.01);
(Continued)

(58) Field of Classification Search
CPC combination set(s) only.
See application file for complete search history.

(56) References Cited

U.S. PATENT DOCUMENTS 6,728,690 B1 * 4/2004 Meek ................... G06K 9/6281
                                                 706/25
2013/0179151 A1 * 7/2013 Iverson .................. G10L 15/19
                                                 704/9
(Continued)

FOREIGN PATENT DOCUMENTS

CN        1842811      10/2006
CN      105677779  *   6/2016   .......... G06F 16/313

OTHER PUBLICATIONS

K. Surya, R. Nithin, S. Prasanna and R. Venkatesan, "A comprehensive study on machine learning concepts for text mining," 2016 International Conference on Circuit, Power and Computing Technologies (ICCPCT), Nagercoil, 2016, pp. 1-5, doi: 10.1109/ICCPCT.2016.7530259. (Year: 2016).*

(Continued)

*Primary Examiner* — James D. Rutten
(74) *Attorney, Agent, or Firm* — Hodgson Russ LLP

(57) ABSTRACT

Embodiments of the present disclosure disclose a method and a device for classifying questions based on artificial intelligence. The method includes: acquiring text content of a question input by a user, and performing a word segmentation process on the text content to obtain a plurality of segmentations; acquiring hidden representation vectors of the plurality of segmentations; generating a first vector of the text content according to the hidden representation vectors; and determining a target responder corresponding to the question according to the first vector and a preset classification model, and appointing the target responder to the user. The method may simplify operation steps, reduce interactions between a user and a service center, and improve efficiency of the service center.

12 Claims, 3 Drawing Sheets

(51) Int. Cl.
*G06F 40/30* (2020.01)
*G06F 40/237* (2020.01)
*G06N 3/08* (2006.01)
*G10L 15/04* (2013.01)
*G10L 15/16* (2006.01)
*G10L 15/02* (2006.01)

(52) U.S. Cl.
CPC ............... *G06N 3/08* (2013.01); *G10L 15/04* (2013.01); *G10L 15/02* (2013.01); *G10L 15/16* (2013.01)

(56) References Cited

U.S. PATENT DOCUMENTS

| | | | | |
|---|---|---|---|---|
| 2014/0214831 | A1* | 7/2014 | Chi | G06Q 10/10 707/737 |
| 2014/0358922 | A1* | 12/2014 | Alkov | G06N 5/043 707/737 |
| 2015/0347557 | A1* | 12/2015 | Allen | G06F 16/285 707/738 |
| 2016/0342895 | A1* | 11/2016 | Gao | G06N 5/04 |
| 2017/0278510 | A1* | 9/2017 | Zhao | G10L 15/04 |
| 2017/0278514 | A1* | 9/2017 | Mathias | G10L 15/22 |
| 2017/0324868 | A1* | 11/2017 | Tamblyn | H04M 3/58 |
| 2018/0150739 | A1* | 5/2018 | Wu | G06N 3/006 |
| 2018/0329884 | A1* | 11/2018 | Xiong | G06N 3/0445 |

OTHER PUBLICATIONS

Y. Zhou, B. Xu, J. Xu, L. Yang, C. Li and B. Xu, "Compositional Recurrent Neural Networks for Chinese Short Text Classification," 2016 IEEE/WIC/ACM International Conference on Web Intelligence (WI), Omaha, NE, 2016, pp. 137-144, doi: 10.1109/WI.2016.0029. (Year: 2016).*

Wang, "Research and Improvement on Text Classification Based on Word Embedding," Dissertation of 2016 Master Degree, East China Normal University, English Translation, May 2016 (Year: 2016).*

S. Qu, S. Wang, Y. Zou and Q. Wang, "Research and Design of Intelligent Question Answering System," 2008 International Conference on Computer and Electrical Engineering, 2008, pp. 711-714, doi: 10.1109/ICCEE.2008.29. (Year: 2008).*

R. Jiang, R. E. Banchs, S. Kim, L. F. D'Haro, A. I. Niculescu and K. H. Yeo, "Configuration of dialogue agent with multiple knowledge sources," 2015 Asia-Pacific Signal and Information Processing Association Annual Summit and Conference (APSIPA), 2015, pp. 840-849, doi: 10.1109/APSIPA.2015.7415390. (Year: 2015).*

Wang, "Research and Improvement on Text Classification Based on Word Embedding," Dissertation of 2016 Master Degree, East China Normal University, May 2016, 57 pages.

SIPO, First Office Action for CN Application No. 201610972616, dated Jan. 23, 2019.

SIPO, Third Office Action for CN Application No. 201610972616.4, dated Nov. 26, 2019.

* cited by examiner

METHOD AND DEVICE FOR CLASSIFYING QUESTIONS BASED ON ARTIFICIAL INTELLIGENCE

CROSS-REFERENCE TO RELATED APPLICATIONS

This application is based on and claims a priority to Chinese Patent Application Serial No. 201610972616.4, filed on Oct. 28, 2016, the entire content of which is incorporated herein by reference.

TECHNICAL FIELD

The present disclosure relates to the field of information processing technology, and more particularly, to a method and a device for classifying questions based on artificial intelligence.

BACKGROUND

Artificial Intelligence (AI for short) is a new technical science studying and developing theories, methods, techniques and application systems for simulating, extending and expanding human intelligence. The artificial intelligence is a branch of computer science, which attempts to know the essence of intelligence and to produce an intelligent robot capable of acting as a human. The researches in this field include robots, speech recognition, image recognition, natural language processing and expert systems, etc.

With the rapid development of Internet and the popularity of the artificial intelligence, more and more services employ a manner of asking questions by users towards a service center (such as a call center, or an assistance center set on a website online), such that various types of services, such as pre-sale services, customer services, consultations and the like are provided.

In the related art, the service center generally provides a responder closest to the questions asked by the user based on manners defined by the user, such as a manual selection via the user and the like. For example, when the service center provides the customer services, the pre-sale services, the consultations and the like for the user, it generally requires the user to find the responder with a dial keyboard or multilevel-menu selections. However, this manner often requires the user to perform multiple interactions with the service center. It may be possible to bring a mistake. Furthermore, if any menu is selected in error, the user must to turn back to beginning, which makes the user's experience poor. Meanwhile, efficiency of the service center may be reduced as a suitable responder is not found.

SUMMARY

Embodiments of the present disclosure provide a method for classifying questions based on artificial intelligence. The method includes: acquiring text content of a question input by a user, and performing a word segmentation process on the text content to obtain a plurality of segmentations; acquiring hidden representation vectors of the plurality of segmentations; generating a first vector of the text content according to the hidden representation vectors; and determining a target responder corresponding to the question according to the first vector and a preset classification model, and appointing the target responder to the user.

Embodiments of the present disclosure provide a device for classifying questions based on artificial intelligence. The device includes a processor; a memory, configured to store instructions executable by the processor; in which the processor is configured to: acquire text content of a question input by a user; perform a word segmentation process on the text content to obtain a plurality of segmentations; acquire hidden representation vectors of the plurality of segmentations; generate a first vector of the text content according to the hidden representation vectors; determine a target responder corresponding to the question according to the first vector and a preset classification model; and appoint the target responder to the user.

Embodiments of the present disclosure provide a non-transitory computer readable storage medium. When instructions stored in the storage medium is executed by a processor of an electronic device, a method for classifying questions based on artificial intelligence may be executed by the electronic device. The method includes: acquiring text content of a question input by a user, and performing a word segmentation process on the text content to obtain a plurality of segmentations; acquiring hidden representation vectors of the plurality of segmentations; generating a first vector of the text content according to the hidden representation vectors; and determining a target responder corresponding to the question according to the first vector and a preset classification model, and appointing the target responder to the user.

Embodiments of the present disclosure provide a computer program product. When instructions in the computer program product are executed by a processor, a method for classifying questions based on artificial intelligence is executed. The method includes: acquiring text content of a question input by a user, and performing a word segmentation process on the text content to obtain a plurality of segmentations; acquiring hidden representation vectors of the plurality of segmentations; generating a first vector of the text content according to the hidden representation vectors; and determining a target responder corresponding to the question according to the first vector and a preset classification model, and appointing the target responder to the user.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
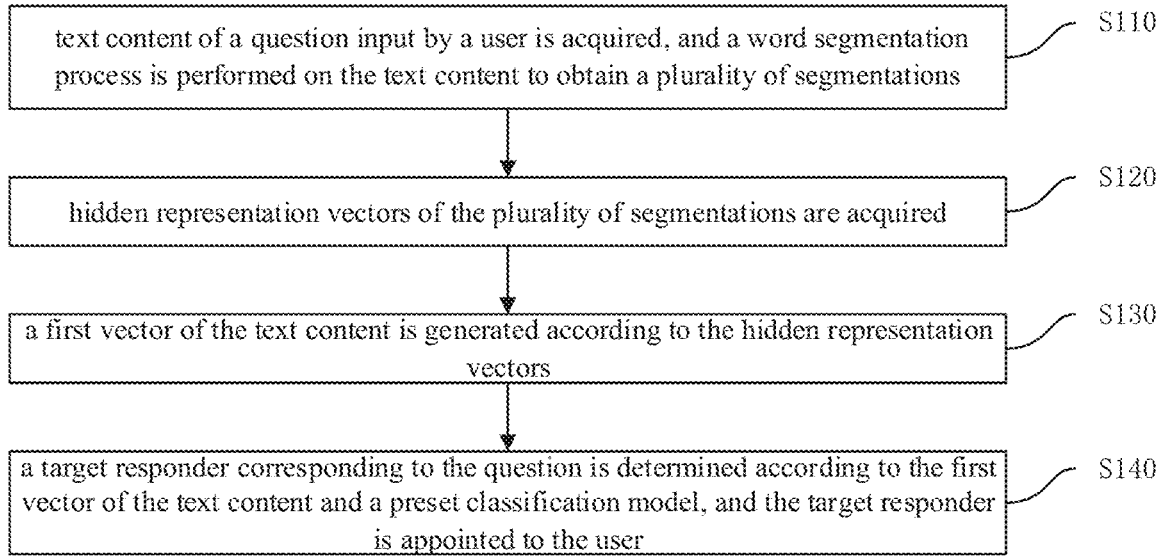
FIG. 1 is a flow chart illustrating a method for classifying questions based on artificial intelligence according to an embodiment of the present disclosure.

Embodiments of the present disclosure will be described in detail and examples of embodiments are illustrated in the drawings. The same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

A method and a device for classifying questions based on artificial intelligence according to embodiments of the present disclosure will be described with reference to the drawings.

FIG. 1 is a flow chart illustrating a method for classifying questions based on artificial intelligence according to an embodiment of the present disclosure. It is to be illustrated that, the method for classifying questions based on artificial intelligence according to embodiments of the present disclosure may be applied to a device for classifying questions based on artificial intelligence according to embodiments of the present disclosure. The device for classifying questions based on artificial intelligence according to embodiments of the present disclosure may be suitable for a scenario of appointing a responder to a user by a service center for providing customer services, pre-sale services, consultations and the like.

As illustrated in FIG. 1, the method includes followings.

At act S110, text content of a question input by a user is acquired, and a word segmentation process is performed on the text content to obtain a plurality of segmentations.

For example, it is assumed that the method for classifying questions based on artificial intelligence according to embodiments of the present disclosure is applied to the device for classifying questions based on artificial intelligence according to embodiments of the present disclosure. The device is applied on a mobile terminal. The mobile terminal is configured to provide an application program or an interface for inputting the question by the user, such that the user may input questions desired by the user via the application program or the interface. When it is detected that the user finishes inputting the question, the text content of the question input by the user may be acquired and the word segmentation process is performed on the text content to obtain the plurality of segmentations by a segmentation tool. For example, the text content may be segmented into n segmentations, denoted as w1, w2 . . . wn. Taking a segmentation tool for segmenting Chinese characters as an example, the segmentation tool may be an IKAnalyzer segmentation tool, a PaodingAnalyzer segmentation tool and the like. It may be understood that, the above segmentation tools for segmenting Chinese characters are illustrated only for exemplary purpose and cannot be construed to limit embodiments of the present disclosure.

At act S120, hidden representation vectors of the plurality of segmentations are acquired.

In detail, in an embodiment of the present disclosure, word vectors of the plurality of segmentations may be acquired. Then, the word vectors are converted into the hidden representation vectors based on a Neural Network Model. More specifically, the plurality of segmentations may be trained with a word2vec model (which is a tool launched by Google for acquiring the word vector) to obtain the word vectors of respective segmentations. It may be understood that, the word vector has perfect semantic performances, such that it is common to represent semantic features via the word vector. A value of each dimension of the word vector is representative of one feature understood with some semantic meaning and grammar. So, each dimension of the word vector may be referred as one semantic feature. After the word vectors of the plurality of segmentations are acquired, the word vectors may be converted into the hidden representation vectors of the plurality of segmentations by using the Neural Network Model. For example, the Neural Network Model may be a Recurrent Neural Network (RNN for short) Model, a Multi-Path Feedback RNN Model, a Long Short-Term Memory (LSTM for short) RNN Model or a gated RNN (i.e. a RNN Model being able to achieve a long-distance dependence process).

That is to say, after the respective word vector of each segmentation is acquired, the word vector may be converted into the respective hidden representation vector of that segmentation by using the Neural Network Model. For example, n segmentations are denoted as w1, w2 . . . wn, the word vector of each segmentation may be converted into the hidden representation vector of that segmentation by using the Neural Network Model, and the hidden representation vectors of the plurality of segmentations are denoted as h1, h2, . . . , hn.

It may be understood that, in order to ensure usability and feasibility of the method provided in embodiments of the present disclosure, the above Neural Network Model may be obtained by training train data in advance. For obtaining parameters of the Neural Network Model, it may require a number of train data (such as <input (text content), responder>). However, generally, these train data is not enough, resulting in an over-fit of the model parameters to the train data, which has a poor result. In order to avoid this case, a large amount of sample words are used in embodiments of the present disclosure. The sample words are trained to obtain the word vectors. The train data and the word vectors are taken as sample data to be trained to obtain the Neural Network Model. In detail, in an embodiment of the present disclosure, the Neural Network Model may be obtained via followings.

At 121, sample words are acquired, and the sample words are trained with a text length representation model (such as a word2vec model) to obtain the word vectors of the sample words.

It is to be illustrated that, the above sample words may be captured in text information on Internet. After the large amount of sample words are acquired, the sample words may be trained with the word2vec model to obtain the word vectors of the sample words.

At 122, a loss function is used as a training target function to perform a train by using a marked corpus and the word vectors of the sample words to obtain the Neural Network Model.

After the word vectors are obtained, with a FineTuning method based on gradient, the train may be performed by taking the marked train data (such as <input, responder>) and the word vectors of the sample words as the sample words. The loss function is used as the training target function during the train, to further obtain the Neural Network Model.

At act S130, a first vector of the text content is generated according to the hidden representation vectors.

As an example, the hidden representation vectors of the plurality of segmentations are summed up, to obtain the first vector of the text content. It may be understood that, the first vector is representative of the text content in a form of vector.

At act S140, a target responder corresponding to the question is determined according to the first vector of the text content and a preset classification model, and the target responder is appointed to the user.

In detail, the responder with a largest classification probability may be determined according to the first vector of the text content and the preset classification model. Then, the responder with the largest classification probability is considered as the most suitable responder to the question. Finally, the target responder may be appointed to the user. In this case, it only requires the user to input his own question, as so to obtain the most suitable responder to the question automatically. Thus, operation steps are simplified, interactions between the user and the service center are reduced, and the user's experience is improved.

Figure 2:
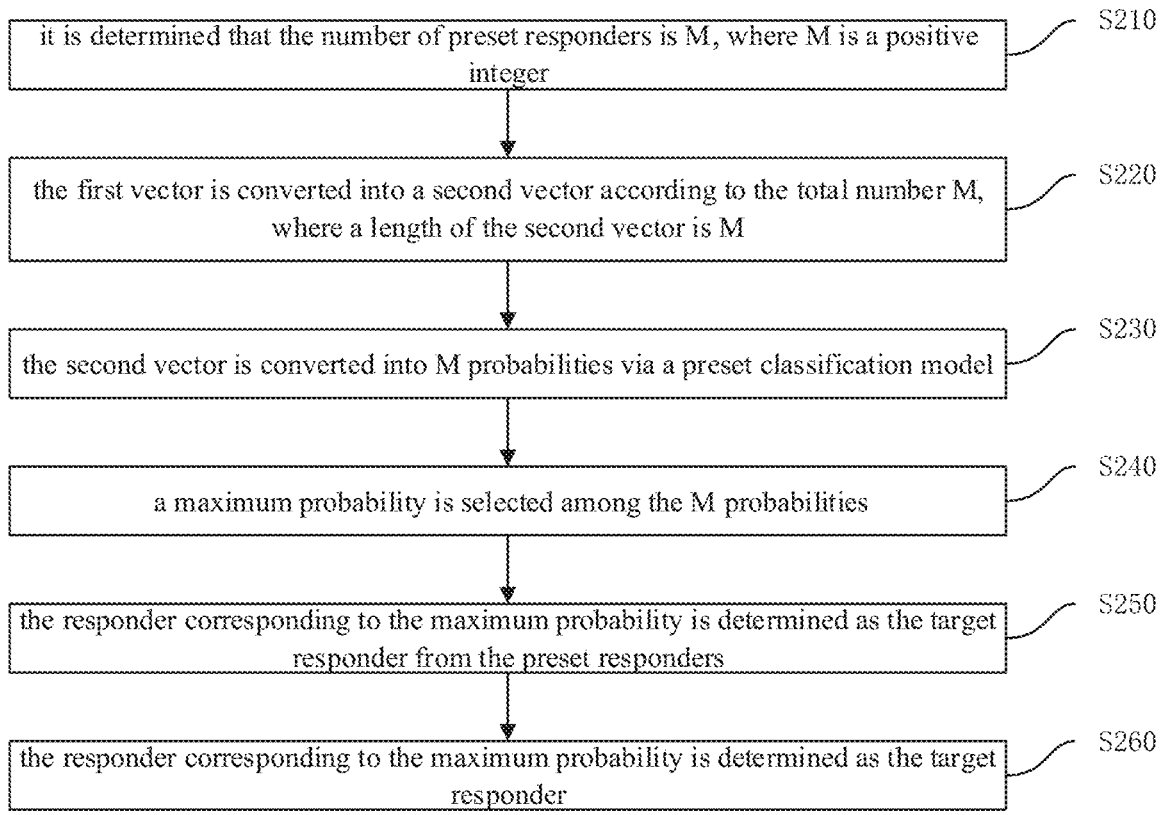
FIG. 2 is a flow chart illustrating a procedure of determining a target responder corresponding to a question according to an embodiment of the present disclosure.

As an example, as illustrated in FIG. 2, the procedure of determining the target responder to the question according to the first vector of the text content and the preset classification model may include followings.

At act S210, it is determined that the number of preset responders is M, where M is a positive integer.

It is to be illustrated that, in order to satisfy the demands of the user, a plurality of responders may be preset to satisfy the demands of answering the questions of the user. As an example, the responder may be a robot for automatically responding or may be a customer service provider.

Accordingly, when the target responder to the question is determined, a total number M of the responders preset may be determined.

At S220, the first vector is converted into a second vector according to the total number M, where a length of the second vector is M.

As an example, the first vector of the text content may be converted into the second vector with the length of M via a linear transformation. The linear transformation may be a Matrix Projection transformation and the like.

At act S230, the second vector is converted into M probabilities via a preset classification model.

As an example, the preset classification model may be a Softmax classification model. In detail, the second vector with the length of M may be converted into M probabilities via the Softmax classification model.

At act S240, a maximum probability is selected among the M probabilities.

At act S250, the responder corresponding to the maximum probability is determined as the target responder from the preset responders.

As the second vector with the length of M is converted into M probabilities and M is the total number of the preset responders, each probability may be understood as a probability of selecting the corresponding responder to respond to the text content. Accordingly, in order to provide the most suitable responder for the user, the maximum probability may be determined among the M probabilities and the responder corresponding to the maximum probability is selected from the M responders.

At act S260, the responder corresponding to the maximum probability is determined as the target responder.

In order to improve usability and feasibility of the method according to embodiments of the present disclosure, the type of inputting the question by the user may be judged to obtain a judged result and a manner for acquiring the text content of the question may be selected in various manners according to the judged result. Alternatively, in an embodiment of the present disclosure, a procedure of implementing the above acquisition of the text content of the question input by the user may include followings. It is determined how the question is input by the user. If the question is input via speech, a speech identification is performed on the speed input. If the question is input via text, the text content of the question is acquired.

That is to say, the user may input the question via speech or via text. After it is detected that the user finishes inputting, it may be determined firstly how the question is input by the user. The user may input the question in a form of speech, in a form of text or the like. if it is determined that the question is input via speech, the speech identification may be performed on the speech input by the user firstly, then the text content of the question may be acquired. If it is determined that the question is input via text, the text content may be directly acquired.

With the method according to embodiments of the present disclosure, the text content of the question input by the user may be acquired, and the word segmentation process is performed on the text content to obtain a plurality of segmentations. Then, the hidden representation vectors of the plurality of segmentations are acquired and the first vector of the text content is generated according to the hidden representation vectors. Finally, the target responder corresponding to the question is determined according to the first vector and the preset classification model and the target responder is appointed to the user. A most suitable responder may be determined automatically to interact with the user according to the question input by the user, thus decreasing operation steps, reducing interactions between the user and the service center, and improving efficiency of the service center.

Figure 3:
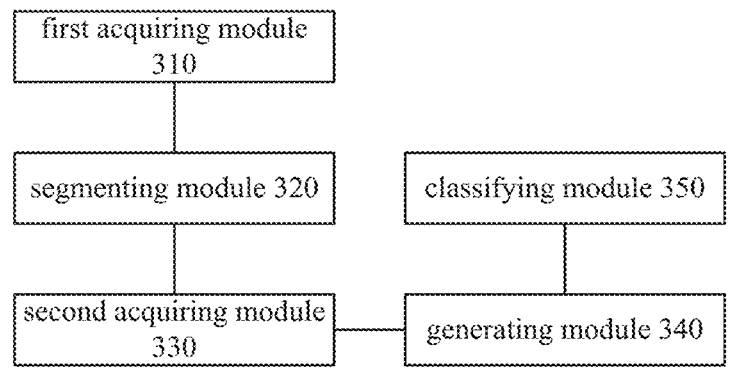
FIG. 3 is a block diagram illustrating a device for classifying questions based on artificial intelligence according to an embodiment of the present disclosure.

Corresponding to the method for classifying questions based on artificial intelligence provided in embodiments of the present disclosure, a device for classifying questions based on artificial intelligence is also provided in embodiments of the present disclosure. As the device corresponds to the method, the implementation of the method is also applicable to the device, such that the implementation of the device may not be elaborated herein. FIG. 3 is a block diagram illustrating a device for classifying questions based on artificial intelligence according to an embodiment of the present disclosure. It is to be illustrated that, the device according to embodiments of the present disclosure may be achieved by software, hardware or a combination thereof. As illustrated in FIG. 3, the device may include: a first acquiring module 310, a segmenting module 320, a second acquiring module 330, a generating module 340 and a classifying module 350.

In detail, the first acquiring module 310 is configured to acquire text content of a question input by a user.

The segmenting module 320 is configured to perform a word segmentation process on the text content to obtain a plurality of segmentations.

Figure 4:
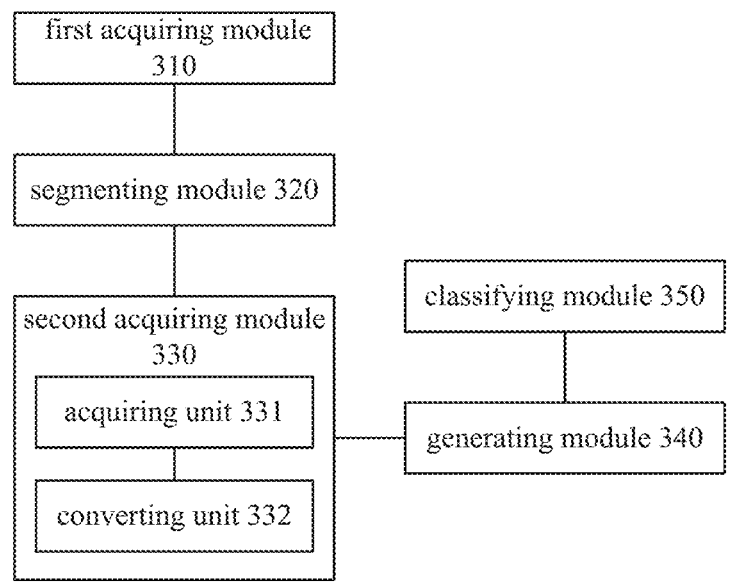
FIG. 4 is a block diagram illustrating a device for classifying questions based on artificial intelligence according to a specific embodiment of the present disclosure.

The second acquiring module 330 is configured to acquire hidden representation vectors of the plurality of segmentations. As an example, as illustrated in FIG. 4, the second acquiring module 330 may include: an acquiring unit 331 and a converting unit 332. The acquiring unit 331 is configured to acquire word vectors of the plurality of segmentations. The converting unit 332 is configured to convert the word vectors into the hidden representation vectors based on a Neural Network Model.

The generating module 340 is configured to generate a first vector of the text content according to the hidden representation vectors.

Figure 5:
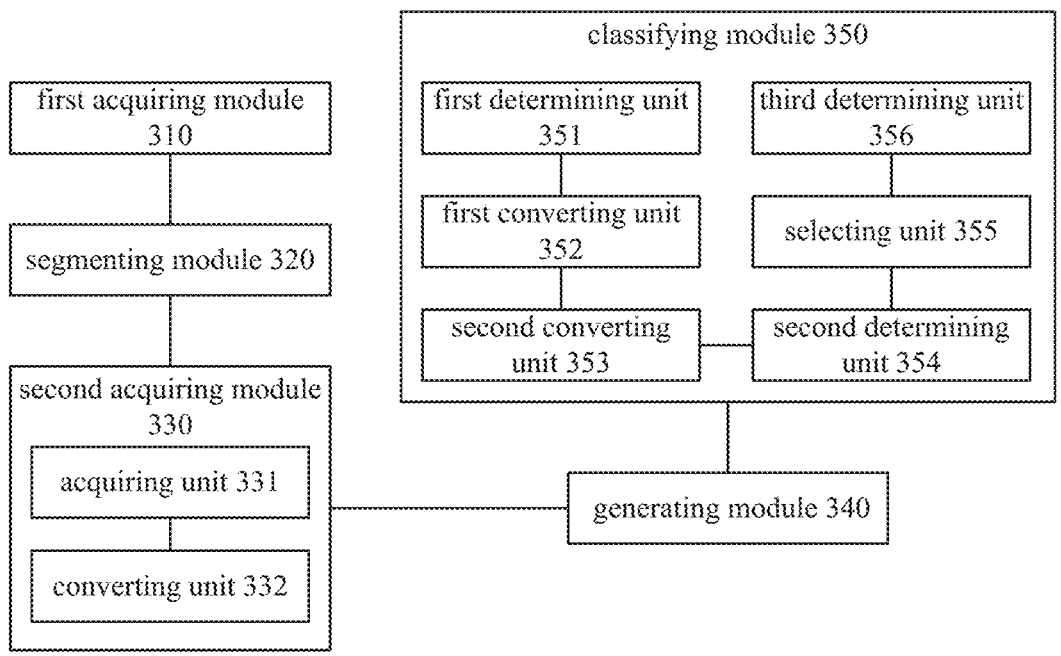
FIG. 5 is a block diagram illustrating a device for classifying questions based on artificial intelligence according to another specific embodiment of the present disclosure.

The classifying module 350 is configured to determine a target responder corresponding to the question according to the first vector and a preset classification model, and to appoint the target responder to the user. As an example, as illustrated in FIG. 5, the classifying module 350 includes: a first determining unit 351, a first converting unit 352, a second converting unit 353, a second determining unit 354, a selecting unit 355 and a third determining unit 356.

The first determining unit 351 is configured to determine a total number M of preset responders, in which M is a positive integer. The first converting unit 352 is configured to convert the first vector into a second vector according to the total number M, in which a length of the second vector is M. The second converting unit 353 is configured to convert the second vector into M probabilities by the preset classification model. The second determining unit 354 is configured to determine a maximum probability among the M probabilities. The selecting unit 355 is configured to select the responder corresponding to the maximum probability from the preset responders according to the maximum probability. The third determining unit 356 is configured to determine the responder corresponding to the maximum probability as the target responder.

Figure 6:
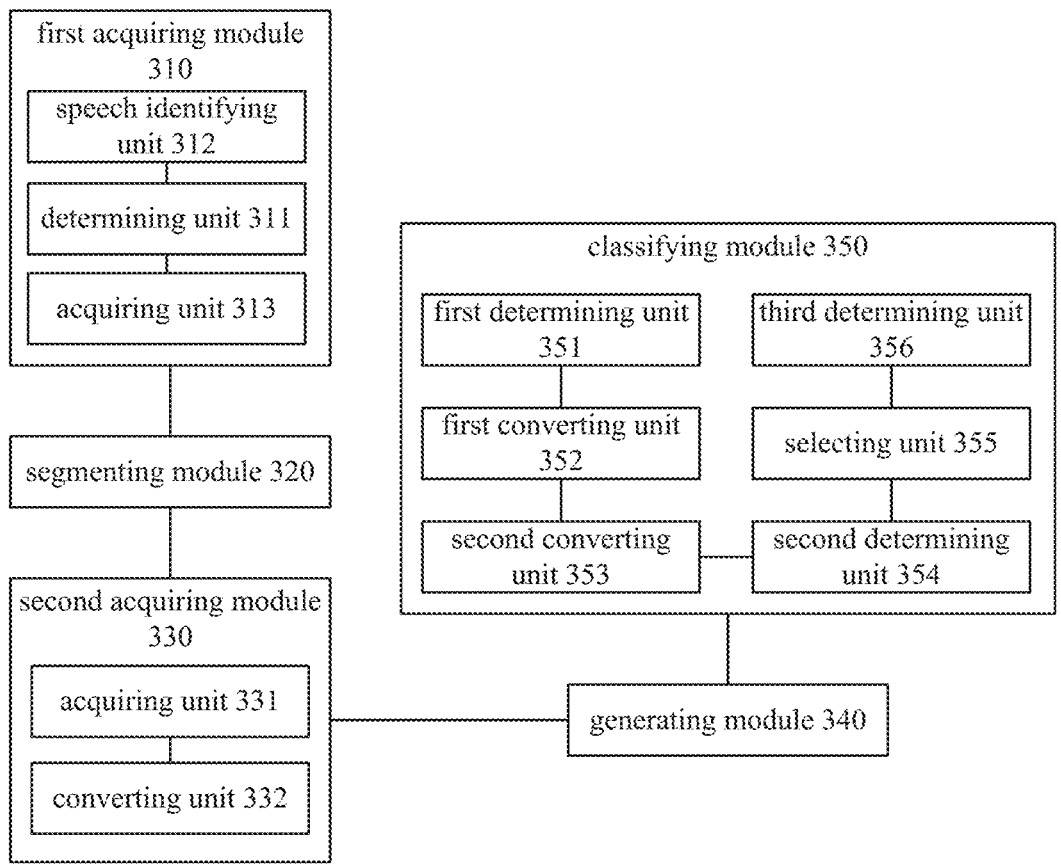
FIG. 6 is a block diagram illustrating a device for classifying questions based on artificial intelligence according to still another specific embodiment of the present disclosure.

Alternatively, as an embodiment of the present disclosure, as illustrated in FIG. 6, the first acquiring module 310 may include a determining unit 311, a speech identifying unit 312 and an acquiring unit 313. The determining unit 311 is configured to determine how the question is inputted by the user. The speech identifying unit 312 is configured to perform a speech identification on the speech inputted to obtain the text content of the question if the question is inputted in speech. The acquiring unit 313 is configured to acquire the text content of the question if the question is inputted in text.

With the device according to embodiments of the present disclosure, the text content of the question input by the user may be acquired via the first acquiring module, and the plurality of segmentations are obtained via the segmenting module by performing the word segmentation process on the text content. The hidden representation vectors of the plurality of segmentations are acquired via the second acquiring module. The first vector of the text content is generated via the generating module according to the hidden representation vectors. And the target responder corresponding to the question is determined via the classifying module according to the first vector and a preset classification model, to appoint the target responder to the user. A most suitable responder may be found automatically to interact with the user according to the question input by the user, thus decreasing operation steps, reducing interactions between the user and the service center, and improving efficiency of the service center.

In the description of the present disclosure, it is to be understood that, the terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, such as two, three and the like, unless specified otherwise.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art.

The logic and/or steps described in other manners herein or illustrated in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for classifying questions based on artificial intelligence, comprising:
    acquiring, by at least one computing device, text content of a question input by a user;
    performing, by the at least one computing device, a word segmentation process on the text content to obtain a plurality of segmentations;
    acquiring, by the at least one computing device, hidden representation vectors of the plurality of segmentations;
    generating, by the at least one computing device, a first vector of the text content according to the hidden representation vectors; and
    determining, by the at least one computing device, a target responder corresponding to the question from a number M of preset responders according to the first vector and a preset classification model, wherein the number M of preset responders are robots, each designed to automatically respond to different classifications of questions, where M is a positive integer; and
    appointing, by the at least one computing device, the target responder to the user;
    wherein determining, by the at least one computing device, a target responder from a number M of preset responders corresponding to the question according to the first vector and a preset classification model comprises:
        converting, by the at least one computing device, the first vector into a second vector according to the number M, wherein a length of the second vector is M;
        converting, by the at least one computing device, the second vector into M probabilities by the preset classification model;
        determining, by the at least one computing device, a maximum probability among the M probabilities; and
            selecting, by the at least one computing device, a responder corresponding to the maximum probability as the target responder from the preset responders according to the maximum probability.

2. The method according to claim 1, wherein acquiring, by the at least one computing device, hidden representation vectors of the plurality of segmentations comprises:
    acquiring, by the at least one computing device, word vectors of the plurality of segmentations; and
    converting, by the at least one computing device, the word vectors into the hidden representation vectors based on a Neural Network Model.

3. The method according to claim 2, wherein the Neural Network Model is obtained by:
    acquiring, by the at least one computing device, data of sample words;
    training, by the at least one computing device, the data with a text deep representation model word2vec, to obtain the word vectors of the sample words; and
    performing, by the at least one computing device, a train by using a loss function as a training target function and by using a marked corpus and the word vectors of the sample words as sample data, to obtain the Neural Network Model.

4. The method according to claim 1, wherein acquiring, by at least one computing device, text content of a question input by a user comprises:
    determining, by the at least one computing device, how the question is inputted by the user;
    if the question is inputted via speech, performing, by the at least one computing device, a speech identification on the speech inputted;
    if the question is inputted via text, acquiring, by the at least one computing device, the text content of the question.

5. A device for classifying questions based on artificial intelligence, comprising:
    a processor;
    a memory, configured to store instructions executable by the processor; wherein the processor is configured to:
    acquire text content of a question input by a user;
    perform a word segmentation process on the text content to obtain a plurality of segmentations;
    acquire hidden representation vectors of the plurality of segmentations;
    generate a first vector of the text content according to the hidden representation vectors;
    determine a target responder corresponding to the question from a number M of preset responders according to the first vector and a preset classification model, wherein the number M of preset responders are robots, each designed to automatically respond to different classifications of questions, where M is a positive integer; and
    appoint the target responder to the user;
    wherein the processor is configured to determine a target responder corresponding to the question from a number M of preset responders according to the first vector and a preset classification model by acts of:
        converting, by the processor, the first vector into a second vector according to the number M, wherein a length of the second vector is M;
        converting, by the processor, the second vector into M probabilities by the preset classification model;
        determining, by the processor, a maximum probability among the M probabilities; and
        selecting, by the processor, a responder corresponding to the maximum probability as the target responder from the preset responders according to the maximum probability.

6. The device according to claim 5, wherein the processor is configured to acquire hidden representation vectors of the plurality of segmentations by acts of:
  acquiring word vectors of the plurality of segmentations; and
  converting the word vectors into the hidden representation vectors based on a Neural Network Model.

7. The device according to claim 6, wherein the processor is configured to obtain the Neural Network Model by acts of:
  acquiring data of sample words;
  training the data with a text deep representation model word2vec, to obtain the word vectors of the sample words; and
  performing a train by using a loss function as a training target function and by using a marked corpus and the word vectors of the sample words as sample data, to obtain the Neural Network Model.

8. The device according to claim 5, wherein the processor is configured to acquire text content of a question input by a user according to acts of:
  determining how the question is inputted by the user;
  if the question is inputted via speech, performing a speech identification on the speech inputted;
  if the question is inputted via text, acquiring the text content of the question.

9. A non-transitory computer readable storage medium, with a computer program stored, wherein the computer program is executed by a processor to achieve a method for classifying questions based on artificial intelligence, and the method comprises:
  acquiring text content of a question input by a user;
  performing a word segmentation process on the text content to obtain a plurality of segmentations;
  acquiring hidden representation vectors of the plurality of segmentations;
  generating a first vector of the text content according to the hidden representation vectors;
  determining a target responder from a number M of preset responders corresponding to the question according to the first vector and a preset classification model, wherein the number M of preset responders are robots, each designed to automatically respond to different classifications of questions, where M is a positive integer; and
  appointing the target responder to the user;
  wherein determining a target responder corresponding to the question from a number M of preset responders according to the first vector and a preset classification model comprises:
    converting, by the processor, the first vector into a second vector according to the number M, wherein a length of the second vector is M;
    converting, by the processor, the second vector into M probabilities by the preset classification model;
    determining, by the processor, a maximum probability among the M probabilities; and
    selecting, by the processor, a responder corresponding to the maximum probability as the target responder from the preset responders according to the maximum probability.

10. The non-transitory computer readable storage medium according to claim 9, wherein acquiring hidden representation vectors of the plurality of segmentations comprises:
  acquiring word vectors of the plurality of segmentations; and
  converting the word vectors into the hidden representation vectors based on a Neural Network Model.

11. The non-transitory computer readable storage medium according to claim 10, wherein the Neural Network Model is obtained by:
  acquiring data of sample words;
  training the data with a text deep representation model word2vec, to obtain the word vectors of the sample words; and
  performing a train by using a loss function as a training target function and by using a marked corpus and the word vectors of the sample words as sample data, to obtain the Neural Network Model.

12. The non-transitory computer readable storage medium according to claim 9, wherein acquiring text content of a question input by a user comprises:
  determining how the question is inputted by the user;
  if the question is inputted via speech, performing a speech identification on the speech inputted;
  if the question is inputted via text, acquiring the text content of the question.

* * * * *